United States Patent
Kim et al.

(10) Patent No.: US 12,338,882 B2
(45) Date of Patent: Jun. 24, 2025

(54) VEHICLE CONTROLLER AND NOISE REDUCING METHOD OF DIFFERENTIAL GEAR

(71) Applicant: Hyundai Transys Incorporated, Seosan-si (KR)

(72) Inventors: Youngkyu Kim, Hwaseong-si (KR); Yeonho Kim, Hwaseong-si (KR); Jong Bae Ahn, Hwaseong-si (KR)

(73) Assignee: Hyundai Transys Incorporated, Seosan-si (KR)

( * ) Notice: Subject to any disclaimer, the term of this patent is extended or adjusted under 35 U.S.C. 154(b) by 247 days.

(21) Appl. No.: 17/943,325

(22) Filed: Sep. 13, 2022

(65) Prior Publication Data

US 2023/0091095 A1 Mar. 23, 2023

(30) Foreign Application Priority Data

Sep. 14, 2021 (KR) ........................ 10-2021-0122702

(51) Int. Cl.
*B60K 23/08* (2006.01)
*B60K 1/00* (2006.01)
(Continued)

(52) U.S. Cl.
CPC .............. *F16H 48/36* (2013.01); *B60K 17/16* (2013.01); *B60K 17/20* (2013.01); *B60K 17/34* (2013.01); *B60K 2023/043* (2013.01); *B60K 23/08* (2013.01); *B60K 2023/0816* (2013.01); *F16H 2048/364* (2013.01)

(58) Field of Classification Search
CPC .... F16H 48/36; F16H 2048/364; F16H 59/02; B60K 17/16; B60K 17/20; B60K 17/34; B60K 23/08; B60K 2023/043; B60K 2023/0816
See application file for complete search history.

(56) References Cited

U.S. PATENT DOCUMENTS

| | | | |
|---|---|---|---|
| 2013/0220722 A1* | 8/2013 | Mita ....................... | B60K 17/34 180/249 |
| 2014/0058638 A1* | 2/2014 | Taniguchi ............. | B60W 10/06 701/69 |

(Continued)

FOREIGN PATENT DOCUMENTS

| | | | | |
|---|---|---|---|---|
| CN | 101559714 A | * | 10/2009 | ............ B60K 17/06 |
| KR | 20-0157995 Y1 | | 10/1999 | |
| WO | WO-2007131616 A2 | * | 11/2007 | ............... B60K 1/00 |

*Primary Examiner* — Tinh Dang
(74) *Attorney, Agent, or Firm* — Bridgeway IP Law Group, PLLC; Jihun Kim (57) ABSTRACT

A vehicle controller for reducing noise of a differential gear of a vehicle, the vehicle including: a ring gear teeth-engaged with a motor reducer, a differential case connected to the ring gear, a differential assembly including a differential gear provided inside the differential case, and a disconnector device connected to at least one gear among the differential gears, the vehicle controller including: an RPM measuring unit for measuring a speed of one vehicle wheel when the vehicle is driven by two wheels; a speed calculation unit for calculating a speed of the ring gear in consideration of the speed of the one vehicle wheel; and a driving unit for driving the ring gear by controlling the motor reducer based on the speed of the ring gear.

11 Claims, 6 Drawing Sheets

(51) Int. Cl.
  *B60K 17/02* (2006.01)
  *B60K 17/356* (2006.01)
  *F16H 48/36* (2012.01)
  *B60K 17/16* (2006.01)
  *B60K 17/34* (2006.01)
  *B60K 23/04* (2006.01)

(56) References Cited

U.S. PATENT DOCUMENTS

2016/0229405 A1* 8/2016 Shimizu ................ B60K 17/35
2020/0278015 A1* 9/2020 Chu ..................... B60K 17/046

* cited by examiner

VEHICLE CONTROLLER AND NOISE REDUCING METHOD OF DIFFERENTIAL GEAR

CROSS-REFERENCE TO RELATED APPLICATIONS

This application claims priority to and the benefit of Korean Patent Application No. 10-2021-0122702 filed in the Korean Intellectual Property Office on Sep. 14, 2021, the entire contents of which are incorporated herein by reference.

TECHNICAL FIELD

The present invention relates to a vehicle controller and a method of reducing noise of a differential gear.

BACKGROUND ART

In general, a vehicle may be classified into a two-wheel drive vehicle or a four-wheel drive vehicle according to a wheel drive method, and a disconnector device for switching a two-wheel drive method and a four-wheel drive method is applied to the vehicle.

In general, the disconnector device is a device capable of minimizing unnecessary power loss by engaging the teeth of the sleeve with the teeth of the differential shaft according to the driving situation and switches the driving method to four-wheel drive (4WD) by power connection, or separates the teeth of the sleeve from the teeth of the differential shaft to switches the driving method to two-wheel drive (2WD).

However, there is a problem in that differential noise is generated when the drive is switched by the disconnector device. The differential noise may distract the driver and impede safe driving.

SUMMARY OF THE INVENTION

The present invention has been made in an effort to provide a vehicle controller for reducing differential noise generated due to rotation, backlash, and the like of a differential gear during two-wheel driving of a vehicle, and a method of reducing noise of the differential gear.

An exemplary embodiment of the present invention provides a vehicle controller for reducing noise of a differential gear of a vehicle, the vehicle including: a ring gear teeth-engaged with a motor reducer, a differential case connected to the ring gear, a differential assembly including a differential gear provided inside the differential case, and a disconnector device connected to at least one gear among the differential gears, the vehicle controller including: an RPM measuring unit for measuring a speed of one vehicle wheel when the vehicle is driven by two wheels; a speed calculation unit for calculating a speed of the ring gear in consideration of the speed of the one vehicle wheel; and a driving unit for driving the ring gear by controlling the motor reducer based on the speed of the ring gear.

The vehicle controller may further include a driving determination unit for determining whether the vehicle is driven by two wheels, in which when the connection between the differential assembly and an auxiliary drive shaft of the other vehicle wheel is released according to an operation of the disconnector device, and rotation of the one vehicle wheel is detected, the driving determination unit may determine that the vehicle is driven by two wheels.

The vehicle controller may further include a transceiver for receiving a rotational speed of the one vehicle wheel from a sensing device, in which the RPM measuring unit may measure the number of revolutions of the one vehicle wheel by using received information.

The speed calculating unit may calculate the number of revolutions of the ring gear by using the number of revolutions of the one vehicle wheel.

The driving unit may control the motor reducer so that the ring gear rotates at a set speed, and reduce the number of relative revolutions between a first side gear of the differential gear connected to the one vehicle wheel and a second side gear of the differential gear connected to the disconnector device according to the rotational driving of the ring gear.

Another exemplary embodiment of the present invention provides a method of reducing noise of a differential gear of a vehicle, the vehicle including: a ring gear teeth-engaged with a motor reducer, a differential case connected to the ring gear, a differential assembly including a differential gear provided inside the differential case, a disconnector device connected to at least one gear among the differential gears, and a controller for controlling the motor reducer, the method including: a wheel speed measurement operation in which the controller measures a speed of one vehicle wheel when the vehicle is driven by two wheels; a ring gear speed calculation operation in which the controller calculates a speed of the ring gear in consideration of the speed of the one vehicle wheel; and a ring gear driving operation in which the controller controls the motor reducer based on the calculated speed of the ring gear to drive the ring gear.

The method may further include a driving determination operation in which the controller determines whether the vehicle is driven by two wheels.

The driving determination operation may include, when the connection between the differential assembly and an auxiliary drive shaft of the other vehicle wheel is released according to the operation of the disconnector device, and rotation of the one vehicle wheel is detected, determining that the vehicle is driven by two wheels.

The wheel speed measurement operation may include receiving a rotation speed of the one vehicle wheel from a sensing device, and measuring the number of revolutions of the one vehicle wheel by using received information.

The ring gear speed calculation operation may include calculating the number of revolutions of the ring gear by using the number of revolutions of the one vehicle wheel.

The ring gear driving operation may include connecting the ring gear and the differential case by controlling a separate connection device and controlling the motor reducer so that the ring gear is rotated at a set speed.

The ring gear driving operation may include reducing the number of relative revolutions between a first side gear of the differential gear connected to the one vehicle wheel and a second side gear of the differential gear connected to the disconnector device according to the rotational driving of the ring gear.

The method may further include a driving stop operation in which when the vehicle does not operate in two-wheel drive, the controller controls the motor reducer to stop rotation of the ring gear.

According to the vehicle controller and the method of reducing noise of the differential gear according to the exemplary embodiments of the present invention, there is an effect in that when the vehicle is driven with two wheels, the noise of the differential gear is reduced by artificially reducing the RPM of the differential gear by using the motor reducer.

There is an effect that NVH (Noise, Vibration, Harshness) performance is improved by suppressing the noise generating factor.

There is an effect of selectively applying noise reduction measures while maintaining the current system of the vehicle.

There is an effect of extending the life of the differential gear by reducing the relative RPM between the side gears in the differential gear.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, it should be noted that in adding reference numerals to the components of each drawing, the same components are given the same reference numerals as much as possible even though they are indicated on different drawings. It should be understood that although the exemplary embodiment of the present invention is described hereafter, the spirit of the present invention is not limited thereto and the present invention may be changed and modified in various ways by those skilled in the art.

Figure 1:
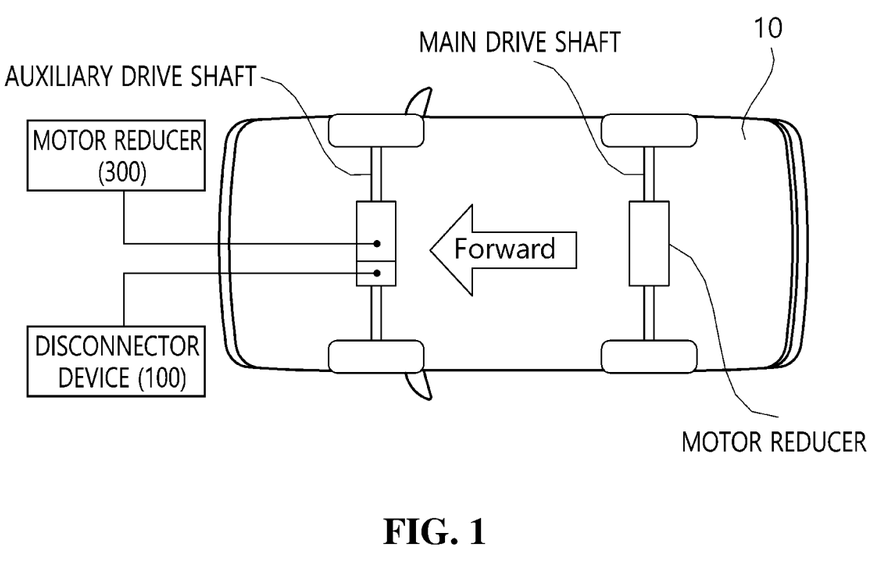
FIG. 1 is a diagram illustrating an installation position of a disconnector device.
Figure 2:
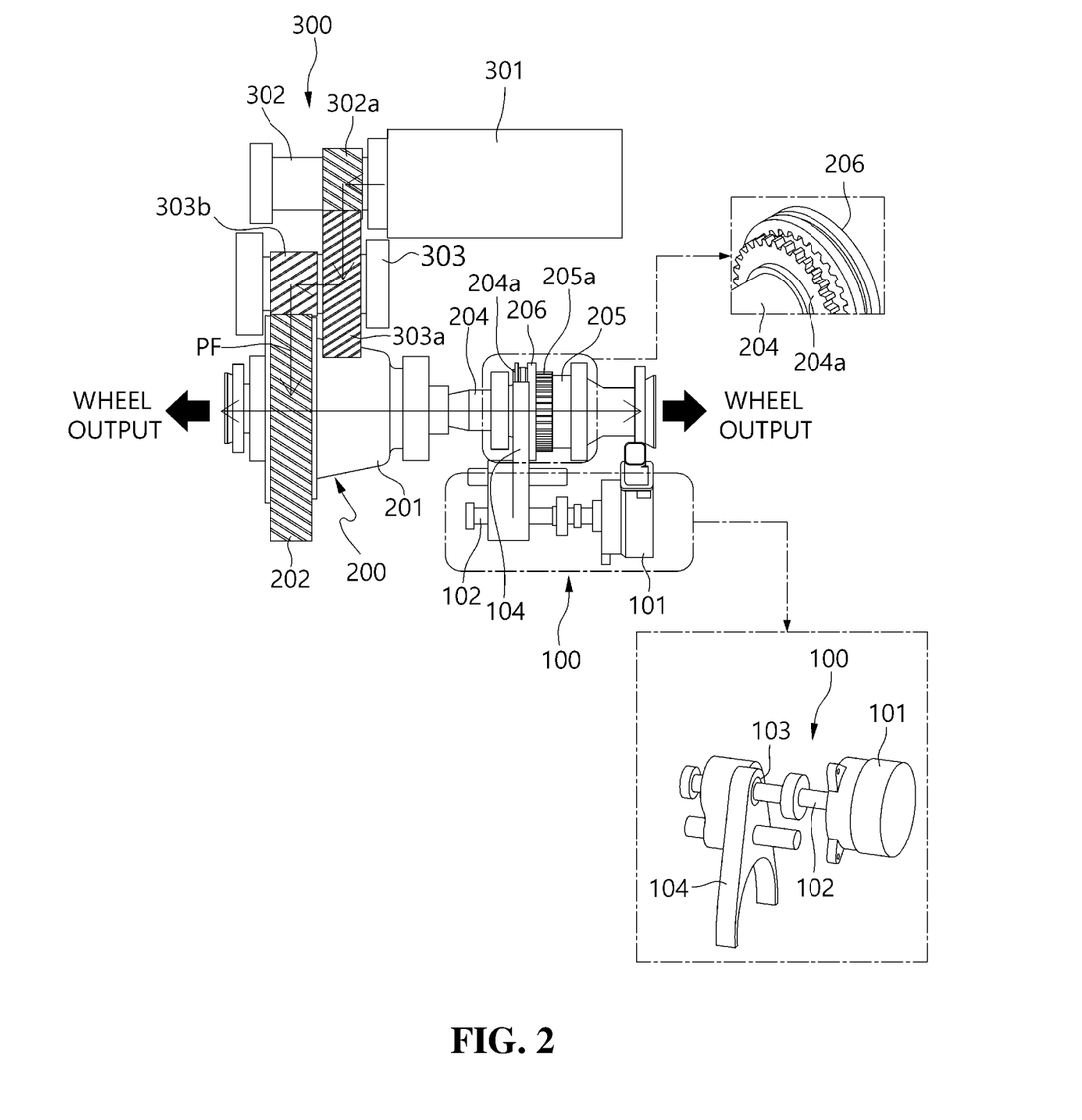
FIG. 2 is a diagram illustrating a configuration of the disconnector device.

FIG. 1 is a diagram illustrating an installation position of a disconnector device. FIG. 2 is a diagram illustrating a configuration of the disconnector device.

Referring to FIGS. 1 and 2, the disconnector device 100 is provided on an auxiliary drive shaft that drives the front wheels of a vehicle 10. The disconnector device 100 is connected to a differential assembly 200.

The differential assembly 200 includes a differential case 201, and two side gears provided inside the differential case 201, and a differential shaft 204 connected to any one of the two side gears. A differential gear set is mounted inside the differential case 201. The differential gear set (not illustrated) may include two side gears and two pinion gears teeth-engaged with the two side gears.

A ring gear 202 is provided outside the differential case 201. The ring gear 202 may be connected to a motor reducer 300 to receive power. The motor reducer 300 includes a traction motor 301 and a first shaft 302 connected to the traction motor 301. A first gear 302a of the first shaft 302 is connected to a second gear 303a provided on the second shaft 303. A third gear 303b provided on the second shaft 303 is connected to the ring gear 202. The power flow PF may be sequentially performed in the traction motor 301, the first gear 302a, the second gear 303a, the third gear 303b, and the ring gear 202. The drive shaft 205 may be surrounded by a housing.

The disconnector device 100 includes a motor 101 for generating power, a ball screw shaft 102 connected to the motor 101, and a nut 103 movable along the ball screw shaft 102 at one end and includes a fork 104 having the other end connected to a sleeve 206. The fork 104 may move the sleeve 206 in the direction of the differential shaft 204. Through this, the fork 104 makes the teeth engagement between the sleeve 206 and the gear 204a of the differential shaft 204, and the gear 205a of the drive shaft 205, so that four-wheel drive (4WD) may be performed. In addition, the fork 104 may move the sleeve 206 in a direction opposite to the differential shaft 204 to separate the sleeve 206 from the differential shaft 204 to achieve two-wheel drive (2WD).

The disconnector device 100 controls the reverse driving force of an auxiliary drive shaft during two-wheel driving of the vehicle to reduce drag loss.

Figure 3:
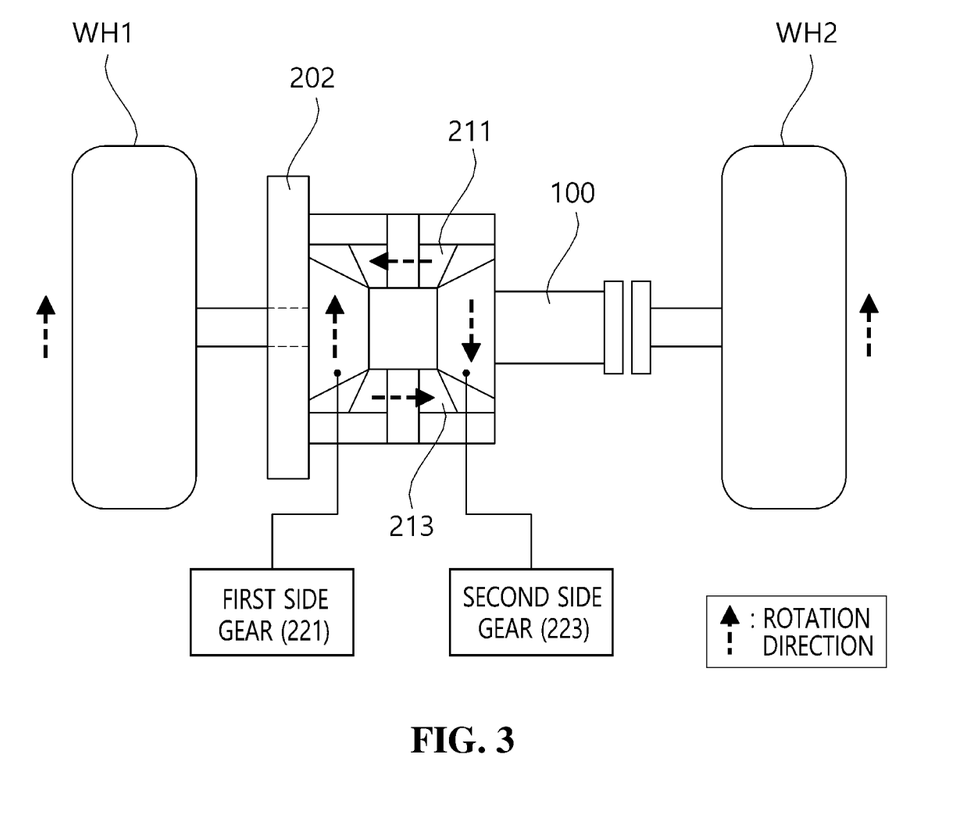
FIG. 3 is a diagram illustrating a rotation direction of a differential gear according to two-wheel drive of a vehicle.

FIG. 3 is a diagram illustrating a rotation direction of the differential gear according to two-wheel drive of a vehicle.

Referring to FIG. 3, the ring gear 202 of the differential assembly 200 does not rotate when the vehicle is driven by two wheels, but the differential gear constantly rotates with the rotation of wheels WH1 and WH2 connected to the auxiliary drive shaft. Here, the differential gear includes a first pinion gear 211, a second pinion gear 213, a first side gear 221, and a second side gear 223.

The first side gear 221 rotates in the same direction and speed as those of the vehicle wheels WH1 and WH2, and the second side gear 223 rotates at the same speed as those of the vehicle wheels WH1 and WH2, but rotates in a direction opposite to those of the vehicle wheels WH1 and WH2. In this case, the number of revolutions of the ring gear 202 may be calculated by dividing a value obtained by adding the number of revolutions of the first side gear 221 and the number of revolutions of the second side gear by half.

On the other hand, during two-wheel drive of the vehicle 10, the differential gear rotates in the entire speed section due to the operating mechanism of the disconnector device 100, and differential noise may be continuously generated due to the rotation, backlash, and the like of the differential gear.

Figure 4:
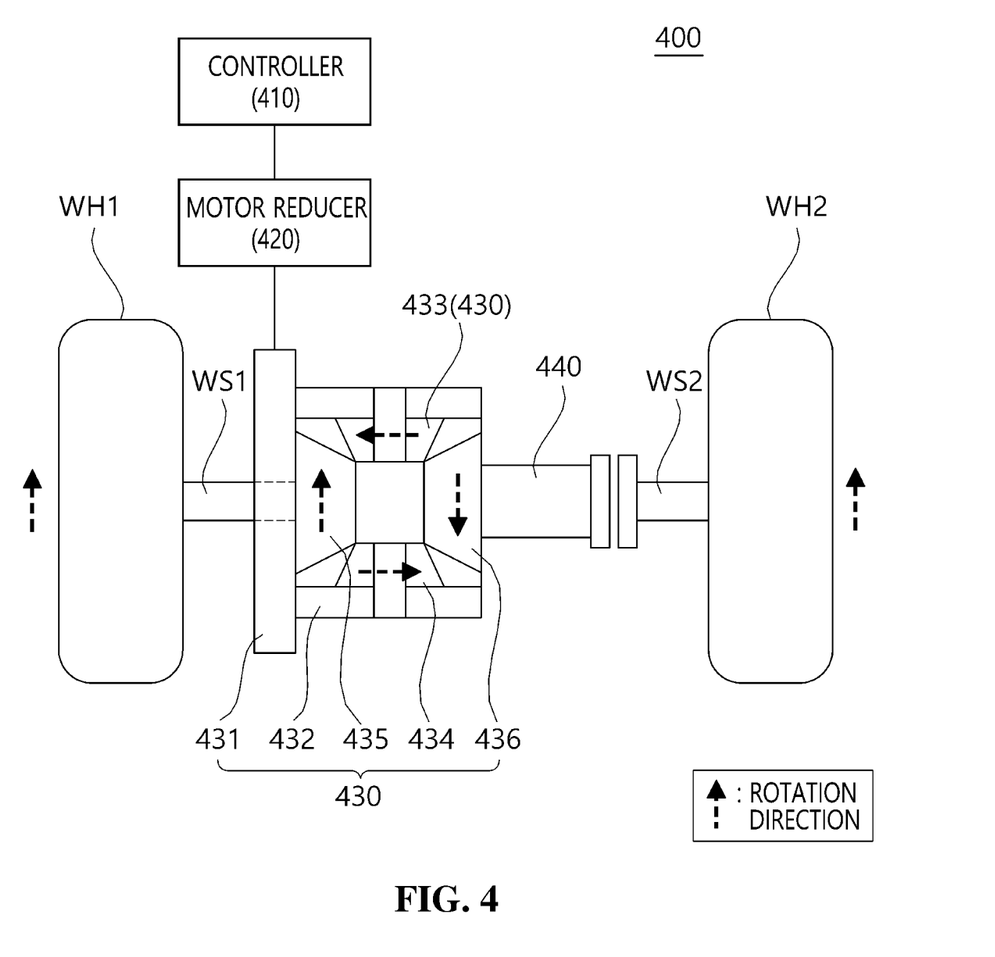
FIG. 4 is a diagram illustrating a noise reduction system for a differential gear according to an exemplary embodiment of the present invention.

FIG. 4 is a diagram illustrating a noise reduction system for the differential gear according to the exemplary embodiment of the present invention.

Referring to FIG. 4, a noise reduction system 400 for a differential gear according to an exemplary embodiment of the present invention is to reduce the noise of the differential gear generated due to continuous rotation, backlash, and the like during two-wheel driving of the vehicle, and includes a controller 410, a motor reducer 420, a differential assembly 430, and a disconnector device 440.

In order to reduce the noise generated by the differential gear of the differential assembly 430 that adjusts the number of revolutions of the left and right vehicle wheels WH1 and WH2 differently during two-wheel driving of the vehicle, the controller 410 may control the operation of the motor reducer 420. The controller 410 may be a vehicle controller including a kind of Transmission Control unit (TCU) or an Engine Control unit (ECU). When the rotations of the vehicle wheels WH1 and WH2 are detected according to the power of a power source (for example, an engine or a motor), the controller 410 may drive the motor of the motor reducer 420.

Figure 5:
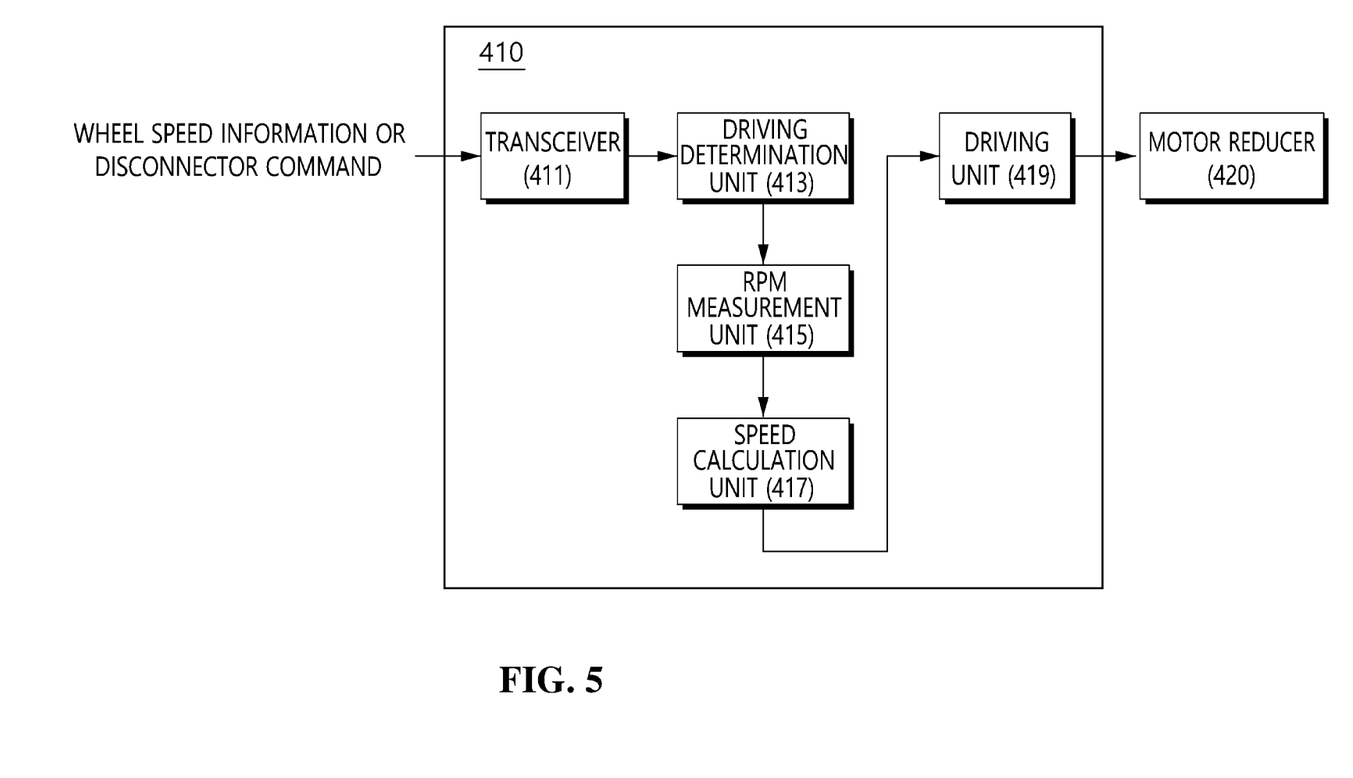
FIG. 5 is a block diagram illustrating a detailed configuration of a controller of FIG. 4.

FIG. 5 is a block diagram illustrating a detailed configuration of the controller of FIG. 4.

Referring to FIG. 5, the controller 410 may include a transceiver 411, a driving determining unit 413, an RPM measuring unit 415, a speed calculating unit 417, and a driving unit 419.

The transceiver 411 may receive the speed of one wheel WH1 through a separate sensing device. Also, the transceiver 411 may receive a disconnector command for the disconnector device 440.

When the connection between the differential assembly 430 and an auxiliary drive shaft WS2 of the other vehicle wheel WH2 is released according to the disconnector command, the driving determining unit 413 may determine that the vehicle is in a two-wheel drive mode. In this case, when the vehicle operates in the two-wheel drive mode, the differential gear rotates together with one vehicle wheel WH1, and noise is generated by the rotation operation of the differential gear.

The RPM measuring unit 415 may measure the RPM of the one vehicle wheel WH1 by using speed information of the one vehicle wheel WH1.

The speed calculating unit 417 may calculate the speed of the ring gear 431 by using the measured RPM of one vehicle wheel WH1. The speed calculating unit 417 may calculate the speed of the ring gear 431 so as to lower the number of relative revolutions between the first and second side gears 435 and 436. In the exemplary embodiment, the speed calculating unit 417 may add the number of revolutions of the first side gear 435 and the number of revolutions of the second side gear 436, and divides the added value by 2 to set the result value to the number of revolutions of the ring gear 431. That is, the controller 410 may set the number of revolutions of one vehicle wheel WH1 to the number of revolutions of the ring gear 431.

When the ring gear 431 and the differential case 432 are connected by a connecting device (not illustrated), the driving unit 419 may control the motor reducer 420 to rotate the ring gear 431 at a set speed. In this case, the power of the motor reducer 420 is transmitted to the differential case 432 and the disconnector shaft of the disconnector device 440 through the rotation of the ring gear 431, and the number of revolutions of the second side gear 436 is reduced according to the rotation operation of the disconnector shaft of the disconnector device 440. Through this, the number of relative revolutions between the first and second side gears 435 and 436 is decreased, and noise generated from the differential gear may be reduced according to the reduced number of relative revolutions.

The driving unit 419 may control the motor reducer 420 to stop the rotation of the ring gear 431 when the vehicle does not operate in the two-wheel drive mode.

Referring back to FIG. 4, the motor reducer 420 may include a motor (not illustrated) operating under the control of the controller 410, and a gear assembly (not illustrated) connected to the motor shaft to reduce and transmit the motor speed. The motor reducer 420 may be operated by the controller 410 to transmit braking force for reduction of the differential gear to the differential assembly 430 when the vehicle is driven by two wheels.

The differential assembly 430 may include the ring gear 431 geared to the motor reducer 420, the differential case 432 including the ring gear 431 formed on the outside, and the differential gear provided inside the differential case 432. Here, the ring gear 431 may be connected to the differential case 432 to be able to transmit power by the operation of a connection device (not illustrated), such as a dog clutch.

The differential gear may be configured by a combination of a first pinion gear 433, a second pinion gear 434, the first side gear 435, and the second side gear 436.

The first pinion gear 433 and the second pinion gear 434 may be teeth-engaged with the first side gear 435 and the second side gear 436, respectively.

The first side gear 435 may be connected to an auxiliary drive shaft WS1 of the one vehicle wheel WH1.

The second side gear 436 may be connected to the disconnector shaft of the disconnector device 440.

The disconnector device 440 may be provided on the auxiliary drive shaft WS2 for driving the other vehicle wheel WH2. The disconnector device 440 may be connected to the differential assembly 430.

The disconnector device 440 connects the disconnector shaft and the auxiliary drive shaft WS2 of the other vehicle wheel WH2 to enable four-wheel drive (4WD), or release the connection of the disconnector shaft and the auxiliary drive shaft WS2 of the other vehicle wheel WH2 to enable two-wheel drive (2WD). A detailed description of the structure of the connection and the connection release of the disconnector device 440 will be omitted.

Figure 6:
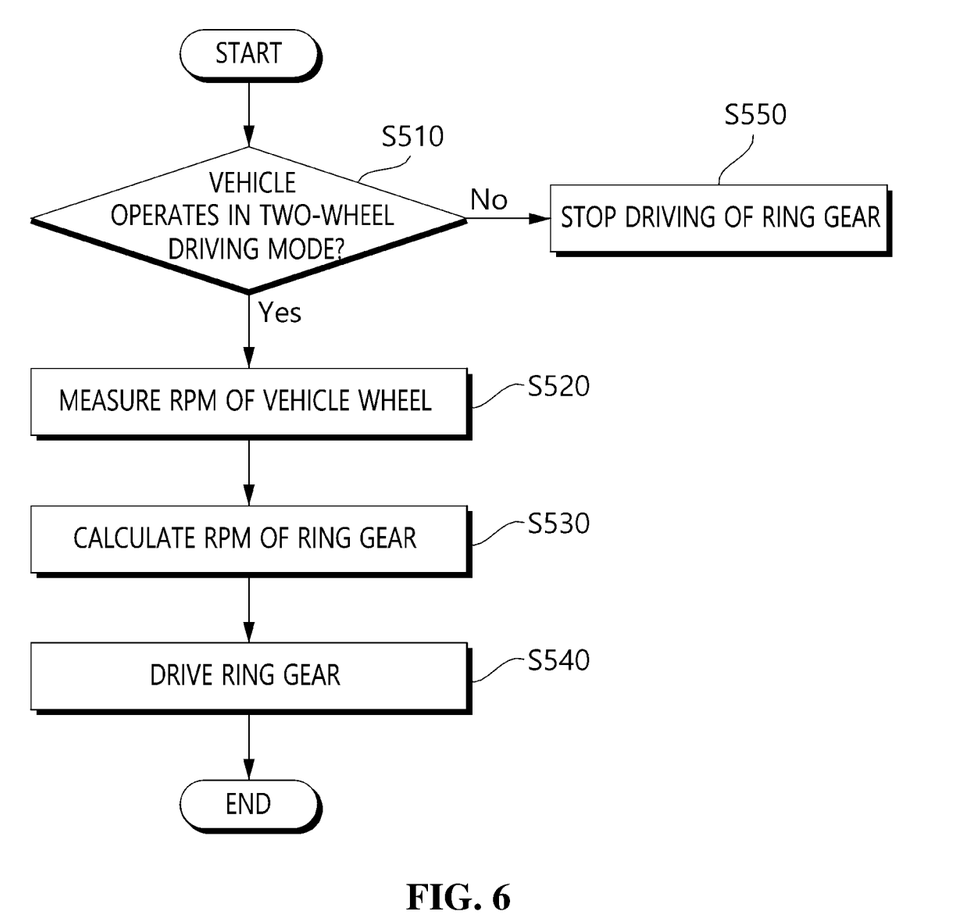
FIG. 6 is a flowchart of a method of reducing noise of a differential gear according to an exemplary embodiment of the present invention.

FIG. 6 is a flowchart of a method of reducing noise of a differential gear according to an exemplary embodiment of the present invention.

Referring to FIGS. 4 to 6, a method for reducing noise of a differential gear according to an exemplary embodiment of the present invention is for reducing noise of a differential gear generated during two-wheel driving of a vehicle and may include a driving determination operation S510, a wheel speed measurement operation S520, a ring gear speed calculation operation S530, a ring gear driving operation S540, and a driving stop operation S550.

First, in the driving determination operation S510, the controller 410 may determine whether the vehicle is driven by two wheels. When the connection between the differential assembly 430 and the auxiliary drive shaft WS2 of the other vehicle wheel WH2 is released according to the operation of the disconnector device 440, the controller 410 may determine that the vehicle is in a two-wheel drive mode. In this case, when the vehicle operates in the two-wheel drive mode, the differential gear rotates together with the vehicle wheel WH1, and noise is generated by the rotation operation of the differential gear. The controller 410 may sequentially perform the following operations in order to reduce the noise of the differential gear.

In the wheel speed measurement operation S520, the controller 410 may receive a rotation speed of one vehicle wheel WH1 connected to the first side gear 435 of the differential assembly 430 from a separate sensor device (not illustrated) when the vehicle is driven by two wheels. The controller 410 may measure the RPM of one vehicle wheel WH1 by using the received information.

In the ring gear speed calculation operation S530, the controller 410 may calculate the speed of the ring gear 431 using the measured RPM of one vehicle wheel WH1. Hereinafter, a method of calculating the speed of the ring gear 431 will be described.

When the ring gear 431 is arbitrarily rotated in a state in which the differential assembly 430 and the other vehicle wheel WH2 are disconnected by the disconnector device 440, the RPM of the differential gear may be represented in Table 1 below.

TABLE 1

| Item | Unit | When ring gear does not rotate | When ring gear arbirarily rotates |
|---|---|---|---|
| Number of revolutions of one vehicle wheel WH1 | RPM | 100 | 100 |
| Number of revolutions of first side gear 435 | RPM | 100 | 100 |
| Number of revolutions of ring gear 431 | RPM | 0 | 30 |
| Number of revolutions of second side gear 436 | RPM | −100 (direction opposite to first side gear 435) | −40 (direction opposite to first side gear 435) |
| Number of revolutions of the other vehicle wheel WH2 | RPM | 100 | 100 |
| Number of relative revolutions between first and second side gears 435 and 436 | RPM | 100 | 140 |

Referring to Table 1, when the ring gear 431 is arbitrarily rotated at a speed of 30 RPM, it can be seen that the number of revolutions of the second side gear 436 is reduced from −100 RPM to −40 RPM, and the number of relative revolutions between the first and second side gears 435 and 436 is reduced from 200 RPM to 140 RPM. That is, it can be seen that the number of relative revolutions between the first and second side gears 435 and 436 is reduced by two times the number of revolutions of the ring gear 431.

The controller 410 may calculate the speed of the ring gear 431 so as to lower the number of relative revolutions between the first and second side gears 435 and 436 based on Table 1 above. In the exemplary embodiment, the controller 410 may add the number of revolutions of the first side gear 435 and the number of revolutions of the second side gear 436, and divides the added value by 2 to set the result value to the number of revolutions of the ring gear 431. That is, the controller 410 may set the number of revolutions of one vehicle wheel WH1 to the number of revolutions of the ring gear 431.

In the ring gear driving operation S540, the controller 410 may control the connection device (not illustrated) to connect the ring gear 431 and the differential case 432, and control the motor reducer 420 so as to rotate the ring gear 431 at a set speed. In this case, the power of the motor reducer 420 is transmitted to the differential case 432 and the disconnector shaft of the disconnector device 440 through the rotation of the ring gear 431, and the number of revolutions of the second side gear 436 is reduced according to the rotation operation of the disconnector shaft of the disconnector device 440. Through this, the number of relative revolutions between the first and second side gears 435 and 436 is decreased, and noise generated from the differential gear may be reduced according to the reduced number of relative revolutions.

Meanwhile, in the driving stop operation S550, when the vehicle does not operate in the two-wheel drive mode, the controller 410 may control the motor reducer 420 to stop rotation of the ring gear 431. Also, the controller 410 may release the connection between the ring gear 431 and the differential case 432 by using a separate connection device (not illustrated).

Although the exemplary embodiment of the present invention has been described for illustrative purposes, those skilled in the art will appreciate that various modifications, additions and substitutions are possible, without departing from the essential characteristic of the invention. Therefore, the exemplary embodiments disclosed in the present invention and the accompanying drawings are not intended to limit the technical spirit of the present invention, but are intended to illustrate the scope of the technical idea of the present invention, and the scope of the present invention is not limited by the exemplary embodiment and the accompanying drawings.

The operations and/or operations according to the present invention may occur in different orders, or in parallel, or simultaneously in different exemplary embodiments for different epochs and the like as may be appreciated by those skilled in the art.

Depending on the exemplary embodiment, a part or the entirety of the operations and/or operations may be partially implemented or performed at least by using commands stored in one or more non-temporary computer-readable media, a program, an interactive data structure, and one or more processors driving a client and/or a server. One or more non-temporary computer-readable media are, for example, software, firmware, hardware, and/or any combination thereof. Further, the function of "module" discussed in the present specification may be implemented by software, firmware, hardware, and/or any combination thereof.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A vehicle controller for reducing noise of a differential gear of a vehicle, the vehicle including: a ring gear teeth-engaged with a motor reducer, a differential case connected to the ring gear, a differential assembly including differential gears disposed inside the differential case, and a disconnector device connected to at least one of the differential gears, the vehicle controller comprising:
    an RPM measuring unit configured to measure a rotational speed of one vehicle wheel when the vehicle is being driven in a two-wheel drive mode;

a speed calculation unit configured to calculate a rotational speed of the ring gear based on the rotational speed of the one vehicle wheel; and a driving unit configured to drive the ring gear by controlling the motor reducer based on the rotational speed of the ring gear, wherein the driving unit is configured to, by rotational driving of the ring gear, reduce a number of relative revolutions between a first side gear of the differential gear connected to the one vehicle wheel and disposed inside the differential case and a second side gear of the differential gear connected to the disconnector device and disposed inside the differential case when the vehicle is being driven in the two-wheel drive mode, wherein the driving unit is configured to reduce the number of relative revolutions between the first side gear and second side gear by two times a number of revolutions of the ring gear per unit of time when the ring gear rotates.

2. The vehicle controller of claim 1, further comprising:
a driving determination unit configured to determine that the vehicle is being driven in the two-wheel drive mode when connection between the differential assembly and an auxiliary drive shaft of another vehicle wheel is released according to an operation of the disconnector device and rotation of the one vehicle wheel is detected.

3. The vehicle controller of claim 1, further comprising:
a transceiver configured to receive speed information of the one vehicle wheel from a sensing device,
wherein the RPM measuring unit is configured to measure a number of revolutions per unit of time of the one vehicle wheel by using the speed information.

4. The vehicle controller of claim 3,
wherein the speed calculation unit is configured to calculate the number of revolutions of the ring gear per unit of time by using the number of revolutions of the one vehicle wheel per unit of time.

5. The vehicle controller of claim 4,
wherein the driving unit is configured to control the motor reducer so that the ring gear rotates at a speed set at the number of revolutions of the ring gear per unit of time.

6. A method of reducing noise of a differential gear of a vehicle, the vehicle including: a ring gear teeth-engaged with a motor reducer, a differential case connected to the ring gear, a differential assembly including differential gears disposed inside the differential case, a disconnector device connected to at least one gear among the differential gears, and a controller for controlling the motor reducer, the method comprising:

measuring, by the controller, a rotational speed of one vehicle wheel when the vehicle is being driven in a two-wheel drive mode;

calculating, by the controller, a rotational speed of the ring gear based on the rotational speed of the one vehicle wheel; and controlling, by the controller, the motor reducer based on the rotational speed of the ring gear to drive the ring gear;

and reducing, by rotational driving of the ring gear, a number of relative revolutions between a first side gear of the differential gear connected to the one vehicle wheel and disposed inside the differential case and a second side gear of the differential gear connected to the disconnector device and disposed inside the differential case when the vehicle is being driven in the two-wheel drive mode, wherein the reducing includes reducing the number of relative revolutions between the first side gear and second side gear by two times a number of revolutions of the ring gear per unit of time when the ring gear rotates.

7. The method of claim 6, further comprising:
determining, by the controller, whether the vehicle is being driven in the two-wheel drive mode.

8. The method of claim 7,
wherein the determining whether the vehicle is driven in the two-wheel drive mode includes, when connection between the differential assembly and an auxiliary drive shaft of another vehicle wheel is released according to an operation of the disconnector device, and when rotation of the one vehicle wheel is detected, determining that the vehicle is being driven in the two-wheel drive mode.

9. The method of claim 6,
wherein the measuring the rotational speed of the one vehicle wheel includes receiving speed information of the one vehicle wheel from a sensing device, and measuring a number of revolutions of the one vehicle wheel per unit of time by using the speed information.

10. The method of claim 9,
wherein the calculating the rotational speed of the ring gear includes calculating a number of revolutions of the ring gear per unit of time by using the number of revolutions of the one vehicle wheel per unit of time.

11. The method of claim 6, further comprising:
when the vehicle operates in a drive mode that is not a two-wheel drive mode, controlling, by the controller, the motor reducer to stop rotation of the ring gear.

* * * * *